United States Patent [19]

Clark

[11] Patent Number: 4,661,282

[45] Date of Patent: Apr. 28, 1987

[54] INORGANIC ANION EXCHANGERS AND PREPARATION THEREOF

[75] Inventor: Howard W. Clark, Midland, Mich.

[73] Assignee: The Dow Chemical Company, Midland, Mich.

[21] Appl. No.: 748,271

[22] Filed: Jun. 24, 1985

[51] Int. Cl.[4] ............................................. B01J 20/08
[52] U.S. Cl. ................................ 252/179; 106/288 B; 210/683; 252/175; 252/184; 423/593; 423/600
[58] Field of Search .................... 106/288 B; 252/175, 252/179, 184; 423/593, 600; 210/683

[56] References Cited

U.S. PATENT DOCUMENTS

| | | | |
|---|---|---|---|
| 3,002,932 | 10/1961 | Duwell et al. ....................... | 252/179 |
| 3,879,525 | 4/1975 | Miyata et al. ....................... | 423/600 |
| 4,145,400 | 3/1979 | Adsetts ............................... | 423/600 |
| 4,326,961 | 4/1982 | Lee et al. ............................ | 210/683 |

FOREIGN PATENT DOCUMENTS 48-29477  9/1973  Japan.

OTHER PUBLICATIONS

Marino et al., "Thermal Stability of Magnesium, Aluminum Double Hydroxides Modified by Anionic Exchange," Thermochim. Acta 1982, 55(3), 377–383, (CA 97:44968).

*Primary Examiner*—Robert A. Wax
*Attorney, Agent, or Firm*—Joe R. Prieto

[57] ABSTRACT

A novel composition including an inorganic mixed metal oxides and partially hydrated oxides exhibiting anion exchange properties and a method of preparing the exchanger composition by coprecipitating hydroxides or hydrated oxides of a pair of metal elements such as aluminum and titanium, drying the mixed metal hydroxides or hydrated oxides, exchanging the anion of the mixed metal hydroxide or hydrated oxide for a nonvolatile anion such as a sulfate anion and calcining the mixed metal hydroxide or hydrated oxide to form a mixed metal oxide or partially hydrated oxide exhibiting anion exchange properties.

35 Claims, No Drawings

INORGANIC ANION EXCHANGERS AND PREPARATION THEREOF

BACKGROUND OF THE INVENTION

This invention relates to ion exchangers and, more particularly, this invention relates to inorganic anion exchangers.

U.S. Pat. No. 3,002,932, issued to E. J. Duwell and J. W. Shepard, describes several noncrystalline inorganic anion exchangers consisting essentially of hydrated oxides of pairs of elements selected from the group consisting of aluminum, silicon, titanium, zinc, and zirconium. The compositions above are prepared by coprecipitating the hydrates of the combination of the oxides of the elements referred to above in an aqueous medium. The coprecipitation is carried out by gradually adding a base to an acid below a pH of 5 to bring the aqueous solution to a pH of about 5 to 7. The aqueous mixture is dried below about 150° C., followed by washing the dried mixed hydrated oxide with water, and again finally drying the mixture below about 150° C.

In a paper by E. J. Duwell and J. W. Shepard, "The Preparation and Properties of Some Synthetic Inorganic Anion Exchangers", Journal of Physical Chemistry, Volume 63, December, pages 2044–47, (1959), various amorphous inorganic anion exchangers are described. The paper describes a method for preparing an amorphous $Zn(OH)_2$ exchanger and $Al(OH)_3$ exchanger. The amorphous exchangers are prepared by coprecipitating cations of higher valence with aluminum and zinc hydroxide in slightly acidic solutions to form a gel. The gels are then dried to form white, finely divided amorphous powders of $Al(OH)_3$ and $Zn(OH)_2$.

In the prior art above, it is reported that dehydration of the exchangers at 150° C. results in the loss of anion exchanger capacity. Thus, the compositions prepared by the methods disclosed in the art cited above are unsatisfactory as anion exchangers at temperatures above 150° C.

It is desired, therefore, to provide novel inorganic anion exchangers with increased thermal and chemical stability at elevated temperatures and with greater exchange capacity at elevated temperatures than previously known inorganic exchange materials. It is also desired to provide a method by which these anion exchangers may be prepared.

SUMMARY OF THE INVENTION

One aspect of the present invention is an anion exchanger comprising a material exhibiting anion exchange properties at temperatures of above about 160° C., said material represented by the formula:

$$[M_{1-x}{}^aQ_x{}^{1+1}O_y(OH)_z](A^{-1})_d(A^{-2})_e(A^{-3})_f(A^{-4})_g \cdot nH_2O$$

wherein M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$ are each one or more exchangeable anions each having a negative valence of 1, 2, 3, and 4, . . . ; and n, z, d, e, f, and g are real numbers greater than or equal to zero and satisfy the following:

$y \geq z$
$2y+z=a$
$0 < d+2e+3f+4g+ \leq x$
$0 \leq n \leq 10$.

Another aspect of the present invention is a method of preparing the compositions above comprising providing a mixed metal hydroxide or hydrated oxide having anion exchange properties, exchanging the anion of the mixed metal hydroxide or hydrated oxide for a non-volatile anion, and heating the exchanged mixed metal hydroxide or hydrated oxide to form a mixed metal oxide exhibiting anion exchange properties at above about 160° C.

DETAILED DESCRIPTION OF THE PREFERRED EMBODIMENTS

The novel compositions of the present invention include mixed metal oxides and partially hydrated mixed metal oxides exhibiting anion exchange properties. The compositions consist essentially of a combination of oxides and hydrated oxides of pairs of metal cations or elements. A first metal element of the pair of metal elements has a lower valence than that of a second metal element of the pair of metal elements. The first lower valent member has a positive valence lower by unity than that of the second higher valent member of the pair. For example, if the first metal element has a valence of +2, the second metal element has a valence of +3, and if the first metal element has a valence of +3 then the second metal element has a valence of +4, and so on.

The first lower valent metal element of the compositions of the present invention is present in a major molar amount and the second higher valent metal element is present in a minor molar amount. It is theorized that the minor constituent is substituted in the lattice structure of the major constituent. The combination of the oxides and hydrated oxides of the pair of metal elements has a positive excess charge and this charge is balanced by an exchangeable anion or a mixture of two or more exchangeable anions.

The mixed metal oxides and partially hydrated mixed metal oxides of the present invention may be represented by the following general formula:

$$[M_{1-x}{}^aQ_x{}^{a+1}O_y(OH)_z](A^{-1})_d(A^{-2})_e(A^{-3})_f(A^{-4})_g \cdot nH_2O$$

where M is a metal element or elements each with a positive valence of a; Q is a metal element or elements each with a positive valence of a+1; a is 2, 3, 4 or 5; $A^{-1}$, $A^{-2}$, $A^{-3}$, and $A^{-4}$ are each one or more exchangeable anions each having a negative valence of 1, 2, 3, and 4, respectively; x is . . . ; and n, z, d, e, f, and g are real numbers greater than or equal to zero and satisfy the following:

$y \geq z$
$2y+z=a$
$0 < d+2e+3f+4g+ \leq x$
$0 \leq n \leq 10$.

With reference to the above general formula, a "hydroxide" is represented by the formula when y=0; an "oxide" is represented by the formula when z=0; and a "partially hydrated oxide" is represented by the formula when y and z are both positive real numbers.

As an example of the composition of the present invention, the metal element or elements M each may have a valence of +2 and the metal element or elements Q each may have a valence of +3. The metal element M with a +2 valence may be selected from elements such as magnesium, calcium, strontium, barium, iron, cobalt, manganese, nickel, copper, zinc and mixtures thereof, and the metal element Q with a valence of +3 may be selected from elements such as aluminum, iron, chromium, gallium, cobalt, rhenium, indium and mixtures thereof.

Another example of a combination of metal elements illustrating the present invention, is the metal element or elements M each having a valence of +3 such as those listed above and the metal element or elements Q each having a +4 valence including, for example, titanium, germanium, tin, lead, zirconium, hafnium, vanadium and mixtures thereof. Another element having a +4 valence operative as Q is silicon. Still another example of a combination of metal elements illustrating the present invention is the metal element or elements M each having a valence of +4 such as those listed above and the metal element or elements Q each having a +5 valence including, for example, antimony, vanadium, niobium, tantalum and mixtures thereof. Other elements having a +5 valence operative as Q are phosphorus and arsenic. Yet another example of a combination of metal elements illustrating the present invention is the metal element or elements M each having a +5 valence such as those listed above and the metal element or elements Q each having a +6 valence including, for example, chromium, molybdenum, tungsten and mixtures thereof.

Preferably, a pair of metal elements M and Q selected from the group consisting essentially of magnesium, aluminum and titanium are used in the present invention. More preferably, mixed metal oxides or partially hydrated mixed metal oxides of aluminum and titanium, and mixed metal oxides or partially hydrated mixed metal oxides of magnesium and aluminum are used as the anion exchange material as herein described.

The preferred compositions of the present invention having a pair of elements of aluminum and titanium may be represented by the following general formula:

$$[Al_{1-x}Ti_xO_y(OH)_z](A^{-1})_d(A^{-2})_e(A^{-3})_f(A^{-4})_g \cdot nH_2O$$

where $A^{-1}$, $A^{-2}$, $A^{-3}$, and $A^{-4}$ are each one or more exchangeable anions each having a negative valence of 1, . . . ; and n, z, d, e, f, and g are real numbers greater than or equal to zero and satisfy the following:
$y \geq z$
$2y + z = a$
$0 < d + 2e + 3f + 4g + \leq x$
$0 \leq n \leq 10$ The preferred compositions of the present invention having a pair of elements of magnesium and aluminum may be represented by the following general formula:

$$[Mg_{1-x}Al_xO_y(OH)_z](A^{-1})_d(A^{-2})_e(A^{-3})_f(A^{-4})_g \cdot nH_2O$$

where $A^{-1}$, $A^{-2}$, $A^{-3}$, and $A^{-4}$ are each one or more exchangeable anions each having a negative valence of 1, . . . ; and n, z, d, e, f, and g are real numbers greater than or equal to zero and satisfy the following:
$y \geq z$
$2y + z = a$
$0 < d + 2e + 3f + 4g + \leq x$
$0 \leq n \leq 10$ The exchangeable anions of the aforementioned compositions may be selected from any inorganic or organic exchangeable anions commonly known in the art of anion exchangers. The exchangeable anions may be selected from monovalent, bivalent, trivalent, tetravalent anions, or mixtures of two or more of these exchangeable anions. In the above formulas, the anion $A^{-1}$, for example, may be an inorganic anion selected from halides such as fluorides ($F^{-1}$), chlorides ($Cl^{-1}$); bromides ($Br^{-1}$); and iodides ($I^{-1}$); sulfates such as $HSO_4^{-1}$; phosphates such as $H_2PO_4^{-1}$; permanganates ($MnO_4^{-1}$); nitrates ($NO_3^{-1}$); carbonates such as $HCO_3^{-1}$; hydroxides ($OH^{-1}$); and mixtures thereof. For example, the anion $A^{-1}$ may be a combination of two or more exchangeable anions described above such as a mixture of $Cl^{-1}$ and $HCO_3^{-1}$ anions. In the above formulas, the anion $A^{-2}$, for example, may be an inorganic anion selected from carbonates such as $CO_3^{-2}$; sulfates such as $SO_4^{-2}$; phosphates such as $H_1PO_4^{-2}$; and mixtures thereof. For example, the anion $A^{-2}$, may be a combination of two or more exchangeable anions described above such as a mixture of $SO_4^{-2}$ and $CO_3^{-2}$. In the above formulas, the anion $A^{-3}$, for example, may be a phosphate such as $PO_4^{-3}$. An example of the anion $A^{-4}$ used in the above formulas may include organic anions such as ethylenediaminetetraacetic acid (EDTA) and diphosphates such as

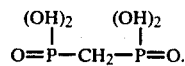

Other organic exchangeable anions used in the above formulas may include, for example, stearates, formates, benzoates and mixtures thereof.

In addition to the above anions used in the present invention, the compositions of the present invention may include a combination of two or more exchangeable anions selected from the group $A^{-1}$, $A^{-2}$, $A^{-3}$ and $A^{-4}$ as described above. For example, the compositions may include a mixture of exchangeable anions such as $Cl^{-1}$ and $CO_3^{-2}$ anions or $Cl^{-1}$ and $SO_4^{-2}$ anions. Preferably, the exchangeable anion in the above compositions of the present invention is a sulfate anion. The total negative charge of the exchangeable anion or mixture of exchangeable anions should be sufficient to balance the excess positive charge of the combination of pairs of metal oxides and hydrated oxides of the composition. The exchangeable anion of the composition is present and bound, i.e., firmly incorporated, in the lattice structure of the composition. Generally, the exchangeable anion cannot be washed free of the composition and remains in the composition until the exchangeable anion is exchanged for or replaced by another anion.

The compositions of the present invention are characterized as exhibiting anion exchange properties, i.e., anion exchange capacity, and, thus, are useful as anion exchangers. Generally, the anion exchangers exhibit anion exchange capacity at elevated temperatures, for example, above about 160° C. and up to about 800° C. Typically, anion exchangers in the prior art have been thermally unstable and lose anion exchange capacity at temperatures of above 150° C. The anion exchangers of the present invention are particularly useful at temperatures of from about 160° C. to about 800° C. Preferably, the exchangers of the present invention are used in the temperature range from about 160° C. to about 500° C.

The anion exchangers of the present invention also exhibit high anion exchange capacities in the temperature range described above. Generally, the anion exchange capacity of the exchanger may range from about 0.5 milliequivalent per gram (meq/g) to about 2.0 meq/g and preferably from about 0.5 meq/g to about 1.0 meq/g.

In its broadest scope, the compositions of the present invention are synthesized via controlled techniques of precipitation, drying, washing, ion exchange and calcination. More particularly, the compositions of the present invention are prepared by coprecipitating mixed metal hydroxides or hydrated mixed metal oxides followed by drying by evaporation, washing with a solvent such as water, exchanging the anion of the coprecipitated mixed hydroxides or hydrated mixed metal oxides for another anion, described hereinafter as a "nonvolatile anion", and then calcining the mixed metal hydroxides or hydrated mixed metal oxides to form mixed metal oxides or partially hydrated mixed metal oxides.

In carrying out the method of the present invention, a precursor mixed metal hydroxide or hydrated mixed metal oxide anion exchanger (precursor material) i.e., having an anion exchange capacity, is first provided as a starting material. The precursor material may be an amorphous or crystalline material prepared by known methods in the art. For example, the coprecipitation method described in U.S. Pat. No. 3,002,932 may be used to prepare an amorphous or noncrystalline mixed metal hydrated oxide which is useful as the precursor material in the present invention. Preferably, a precursor material determined by X-ray diffraction, electron diffraction, electron microscopy or micro area X-ray fluorescence analysis to be crystalline is used in the present invention. The crystalline precursor anion exchanger consisting essentially of a mixed metal hydroxide or hydrated mixed metal oxide is preferably prepared in accordance with the method described in U.S. Patent Application entitled "Inorganic Anion Exchangers and Preparation Thereof", Ser. No. 748,274, filed of even date herewith in the name of Howard Clark, incorporated herein by reference.

Generally, the precursor material is preferably prepared by precipitating mixed metal hydroxides and hydrated mixed metal oxides, drying the precipitate, and then exchanging the anion of the mixed metal hydroxide or hydrated oxide anion exchanger with a nonvolatile anion.

A "nonvolatile anion" is an exchangeable anion bound to the lattice structure of the precursor material which (a) does not react with some other component of the precursor resulting in loss of the precursor material's anion exchange capacity and/or (b) does not volatilize to form a gaseous product resulting in a loss of the precursor material's anion exchange capacity when the precursor material is subjected to heating or to calcination temperatures described hereinafter. For example, a $Cl^-$ anion may evolve HCl gas upon calcining the precursor material and, therefore, considered a volatile anion. Nonvolatile anions used in the present invention include, for example, sulfates, phosphates, chromates, molybdates, tungstates, niobates, and nitrates with sulfates being the most preferred. Any salt of the above nonvolatile anion materials may be used to exchange the anion of the precursor material. Preferably, potassium sulfate or sodium sulfate is used because it is readily available, relatively inexpensive and easily handled in the present process.

As an illustration of one embodiment of preparing the precursor material of the present invention, salts or other derivatives of metals M and Q of the composition of the present invention, are dissolved in a solvent such as water. Preferably, the stoichiometric ratio of Q/M should be above zero to about 0.5. The total concentration of M and Q used in the solution may be above about 0.1 molar and preferably, above about 0.5 molar. The salts used may be acidic, and which on neutralization with a base precipitate the hydroxides or hydrated oxides of metals M and Q. Water-soluble salts or water-insoluble salts may be used. The water-soluble salts may include, for example, salts of chloride ($Cl^{-1}$); sulfates ($SO_4^{-2}$); nitrates ($NO_3^{-1}$); carbonates ($CO_3^{-2}$); and mixtures thereof of the metals M and Q. Water-insoluble salts used may include salts of hydroxides. Preferably, the water-soluble salts of elements M and Q are used.

The preferred base used for neutralization and consequent coprecipitation of the hydroxide or hydrated oxides are the alkali metal bases such as sodium hydroxide or potassium hydroxide. Other bases may include, for example, ammonium hydroxide.

Coprecipitation of the mixed metal hydroxides or hydrated mixed oxides is preferably carried out in an aqueous medium at a pH suitable to produce anion exchange capacity in the hydroxides or hydrated oxides. The preferred pH is a function of the metal cations or elements used to form the composition of the present invention. For example, an aluminum and titanium oxide material may be formed by coprecipitating an aluminum and titanium hydroxide or hydrated oxide at a pH of about 3 to about 7, preferably at a pH of about 4 to about 6, and more preferably at a pH of about 6±1. The coprecipitation is carried out at a temperature of from about room temperature (~20° C.) to about 150° C., preferably from about 50° C. to about 100° C., and more preferably from about 70° C. to about 90° C. As another example of preparing a precursor material, a magnesium and aluminum oxide material may be formed by coprecipitating a magnesium and aluminum hydroxide or hydrated oxide at a pH of about 8 to about 13, and preferably at a pH of about 9 to about 11. The coprecipitation is carried out at a temperature of from about room temperature to 150° C., preferably from about 30° C. to about 90° C., and more preferably from about 40° C. to about 60° C.

During the coprecipitation above, a precipitate material containing a substantial quantity of water is formed when the combination of hydroxides or hydrated oxides are precipitated. The major portion of the water may be removed or separated from the precipitate, for example, by filtration techniques known in the art. After separating the precipitate material from the aqueous media, the material is then dried by heating in air at relatively low temperatures to remove the water in the material. Preferably, a temperature below about 150° C. and more preferably a temperature being in the range of about 100° C. to about below 150° C. is used to dry the material. This dried product may then be washed free of impurities such as sodium chloride, with water such as distilled or deionized water. Removal of such impurities is carried out with water at a pH of from about 4 to about 7. The washed material may be used as the precursor material which is then exchanged with a nonvolatile anion described above.

After the anion of the precursor mixed metal hydroxide or hydrated oxide anion exchanger has been exchanged for a nonvolatile anion, the resulting exchanged material is heated or calcined at a temperature sufficient to form a mixed metal oxide or partially hydrated mixed metal oxide exhibiting anion exchange properties. Calcination temperatures may range from about 160° C. Preferably, a temperature range of about 400° C. to about 600° C. is used. The length of time of calcination may vary, but calcination should be carried out for a length of time sufficient to remove substantially all of the water present in the material. Generally, about 10 minutes to about 3 hours may be used. A white, free-flowing powdery material results after calcination and is characterized as being a mixed metal oxide or partially hydrated mixed metal oxide having anion exchange capacities at above about 160° C.

Optionally, the exchanged material may be washed with water and separated from the aqueous medium by well known means, such as vacuum filtration and then dried at a relatively low temperature, such as below about 150° C. prior to the calcination step described above.

The dried material calcined at the aforementioned calcination temperature is a white, free-flowing, fine, powdery product, typically containing solids having a particle size of about 10 microns or less and preferably a particle size of about 5.0 microns or less. The powder particles may easily be broken up into individual particles having a size of from about 0.1 to about 0.4 micron by techniques known in the art such as grinding.

The anion exchanger material produced by the present invention may be used as an exchanger, alone, or in combination with other additives which are not detrimental to the anion exchange capacity of the exchanger. Other materials or phases which may be mixed with the exchanger may include, for example, fillers such as clays; binders such as cellulosic polymers, in particular, carboxymethylcellulose; and extenders such as $TiO_2$, $Al_2O_3$, and $Al(OH)_3$ which will not substantially adversely affect the anion exchange capacity of the exchanger. Other additives may be used, for example, to pelletize, agglomerate or coat the exchanger, provided the anion exchange capacity of the exchanger is not substantially reduced. The various additives used with the anion exchanger will depend on the application in which the exchanger is used.

The anion exchange material of the present invention may be used in any application wherein an anion exchange mechanism is desired. Applications in which the exchanger is particularly useful include, for example, removing unwanted anions from aqueous systems such as removing chromates and dichromates from water waste streams or removing silicates and colloidal silica from industrial boiler systems.

Another application the anion exchanger of the present invention finds use in is in laundry detergents as an additive for removing undesirable dye migration from one article of clothing to another. Still another application for using the anion exchanger involves removing sulfonated polystyrene from corn syrup by passing the syrup over an ion exchange column containing the anion exchanger of the present invention. Yet another application in which the anion exchanger may be used is in forming pigments by mixing the anion exchanger with a dye.

The present invention, described broadly above, is now illustrated more specifically by the following examples which are not be construed as limiting the scope of the invention.

EXAMPLE 1

An acidic solution was made by diluting 25 liters of a 28 weight percent $AlCl_3$ solution to 60 liters total volume with water. In addition, a $TiCl_4$ solution was made by adding 800 ml of $TiCl_4$, slowly, to 2000 ml of water to obtain a clear solution. The $TiCl_4$ solution was then added to the $AlCl_3$ solution. A base solution was made by dissolving 9000 g of NaOH in 60 liters of water. The $AlCl_3$-$TiCl_4$ solution and the base solution were fed simultaneously into a 10 liter glass reactor in which the pH, temperature, stirring rate and reactant feed rates were controlled. The $AlCl_3$-$TiCl_4$ solution was introduced at 100 ml/min and the base feed rate was controlled to maintain the solution at a pH of about 6.0. The temperature was kept at 90° C. and the stirring rate at 750 rpm. The first three reactor volumes of the reaction material were discarded and the remainder of the material was collected, filtered, dried at 120° C. in an oven overnight, washed with water and redried at 120° C. for three hours.

A white, free-flowing powdery precursor material was obtained having a substantially crystalline structure, a uniform particle size of approximately 0.2 micron and an exchange capacity of 1.5 meq/g. The approximate composition of the precursor material was $[Al_{0.9}Ti_{0.1}O(OH)]Cl_{0.1}\cdot nH_2O$. By X-ray diffraction analysis, the precursor showed the following peaks in the diffraction pattern:

dÅ

6.35
3.08
2.35
1.86
1.44

Thereafter, 100 g of the white powdery precursor material was exchanged with 50 g of $K_2SO_4$ in 500 ml of distilled water. The exchanged material was then filtered and washed with distilled water. The washed material was then dried at 110° to 120° C. The dried material was then calcined at 600° C. for three hours. The calcined material was allowed to cool to room temperature and then washed with distilled water and dried at 110° C. to 120° C. The dried calcined material had the form $[Al_{1.8}Ti_{0.2}O_3](SO_4^{-2})_{0.1}\cdot nH_2O$. The exchange capacity of the product was measured to be 1.0 meq/g.

EXAMPLE 2

A 500 ml solution of $AlCl_3$ and $TiCl_4$ which was 28 percent $AlCl_3$ and 4 percent $TiCl_4$ was added dropwise to a stirred reactor containing 1000 ml of water maintained at a pH of 5 by the addition of NaOH. The reactor was kept at room temperature. The precipitate formed was filtered and dried at 125° C. overnight. X-ray diffraction showed the precipitate to be an amorphous hydrous mixed oxide. The precipitate was then exchanged with 75 g $K_2SO_4$ dissolved in 500 ml of distilled water. The exchanged material was then filtered, washed, and dried at 125° C. for five hours. The dried material was then calcined at 500° C. for three hours. The calcined product was cooled to room temperature and then washed, and dried at 125° C. overnight. The anion exchange capacity of the calcined product which had the form $[Al_{1.8}Ti_{0.2}O_3](SO_4^{-2})_{0.1}\cdot nH_2O$ was analyzed and determined to be 0.8 meq/g.

EXAMPLE 3

A 500 ml solution containing 200 g $MgCl_2\cdot 6H_2O$ and 79.5 g $AlCl_3\cdot 6H_2O$ was added dropwise to a reactor containing 500 ml of water maintained at a pH of 10.0 by the addition of NaOH at 50° C. A precipitate formed in the reactor which was filtered and dried. The precipitate material which had the form [Mg$_3$Al(OH)$_8$]Cl.$n$-H$_2$O was then exchanged with 100 g K$_2$SO$_4$ in 500 ml of water for several minutes. The exchanged material was then filtered and dried at 125° C. The dried material was calcined at 500° C. for 15 minutes, cooled, washed and dried at 125° C. overnight. The calcined product had the form [Mg$_3$AlO$_4$](SO$_4{}^{-2}$)$_{0.5}$.$n$H$_2$O.

What is claimed is:

1. An anion exchanger material comprising a material exhibiting anion exchange properties at temperatures above about 160° C., said material represented by the formula:

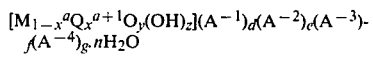
$$[M_{1-x}{}^a Q_x{}^{a+1} O_y(OH)_z](A^{-1})_d(A^{-2})_e(A^{-3})_f(A^{-4})_g \cdot nH_2O$$

wherein M is a metal element or elements each with a positive valence of a; Q is a metal element or elements each with a positive valence of a+1; a is 2, 3, 4, or 5; $A^{-1}$, $A^{-2}$, $A^{-3}$, and $A^{-4}$ are each one or more exchangeable anions each having a negative valence of 1, 2, 3, or 4, respectively; x is $0 < x \leq 0.5$; and n, z, d, e, f, and g are real numbers greater than or equal to zero and satisfy the following:

$y \leq z$
$2y + z = a$
$0 < d + 2e + 3f + 4g + \leq x$
$0 \leq n \leq 10$.

2. The anion exchanger of claim 1 wherein x is from about 0.01 to about 0.4.

3. The anion exchanger of claim 2 wherein x is from about 0.1 to about 0.3.

4. The anion exchanger of claim 1 wherein y is 1 and z is 1.

5. The anion exchanger of claim 1 wherein y is 1 and z is 0.

6. The anion exchanger of claim 1 wherein M is magnesium.

7. The anion exchanger of claim 1 wherein M is aluminum.

8. The anion exchanger of claim 1 wherein Q is aluminum.

9. The anion exchanger of claim 1 wherein Q is titanium.

10. The anion exchanger of claim 1 wherein M is selected from the group consisting essentially of magnesium and aluminum, and Q is selected from the group consisting essentially of aluminum and titanium.

11. The anion exchanger of claim 10 wherein M is magnesium and Q is aluminum.

12. The anion exchanger of claim 10 wherein M is aluminum and Q is titanium.

13. The anion exchanger of claim 1 wherein $A^{-1}$, is one or more anions selected from the group consisting essentially of halides, hydroxides, nitrates, phosphates, carbonates, and mixtures thereof; $A^{-2}$ is one or more anions consisting essentially of phosphates, carbonates, sulfates, and mixtures thereof; and $A^{-3}$ is one or more anions selected from the group consisting essentially of phosphates and mixtures thereof.

14. The anion exchanger of claim 1 wherein $A^{-1}$ is selected from the group consisting of Cl$^{-1}$, Br$^{-1}$, F$^{-1}$, I$^{-1}$, H$_2$PO$_4{}^{-1}$ and mixtures thereof and e, f, and g are zero.

15. The anion exchanger of claim 1 wherein $A^{-2}$ is selected from the group consisting of SO$_4{}^{-2}$, CO$_3{}^{-2}$, H$_2$PO$_4{}^{-2}$ and mixtures thereof and d, f, and g are zero.

16. The anion exchanger of claim 1 wherein $A^{-1}$ is Cl$^{-1}$, $A^{-2}$, is SO$_4{}^{-2}$ and f and g are zero.

17. The anion exchanger of claim 1 characterized as exhibiting anion exchange properties at temperatures from about 160° C. to about 800° C.

18. The anion exchanger of claim 17 characterized as exhibiting anion exchange properties at temperatures from about 400° C. to about 600° C.

19. A method comprising providing an inorganic mixed metal hydroxide or hydrated oxide having anion exchange properties, exchanging the anion of the mixed metal hydroxide or hydrated oxide for a nonvolatile anion that does not decompose to gaseous products between about 160° C. and about 800° C. and heating the exchanged mixed metal hydroxide or hydrated oxide to form a mixed metal oxide exhibiting anion exchange properties at above about 160° C.

20. A method comprising
(a) coprecipitating in an aqueous medium at a constant pH an inorganic mixed metal hydroxide or hydrated oxide;
(b) drying the mixed metal hydroxide or hydrated oxide at a temperature of below about 150° C.,
(c) exchanging the anion of the dried mixed metal hydroxide or hydrated oxide for a nonvolatile anion that does not decompose to gaseous products between about 160° C. and about 800° C., and
(d) heating the exchanged mixed metal hydroxide or hydrated oxide to form a mixed metal oxide exhibiting anion exchange properties at above about 160° C.

21. The method of claim 20 wherein the coprecipitating step is carried out at a temperature of from about 70° C. to about 100° C.

22. The method of claim 21 wherein the coprecipitation is carried out at a temperature of from about 70° C. to about 90° C.

23. The method of claim 20 wherein the mixed hydroxide or hydrated oxide is dried by evaporation in air at a temperature of below about 150° C.

24. The method of claim 23 wherein the drying step is carried out at a temperature of from about 100° C. to about 150° C.

25. The method of claim 24 wherein the drying step is carried out at a temperature of from about 100° C. to about 130° C.

26. The method of claim 20 wherein the heating step is carried out at a temperature above about 160° C.

27. The method of claim 26 wherein the heating step is carried out at a temperature of from about 160° C. to about 800° C.

28. The method of claim 27 wherein the heating step is carried out at a temperature of from about 400° C. to about 600° C.

29. The method of claim 20 wherein the nonvolatile anion is a sulfate anion.

30. The method of claim 20 wherein an aluminum and titanium hydroxide or hydrated oxide is coprecipitated in step (a).

31. The method of claim 30 wherein the aqueous medium is at an acidic pH of from about 3 to about 7.5.

32. The method of claim 31 wherein the aqueous medium is at an acidic pH of from about 4 to about 6.

33. The method of claim 20 wherein a magnesium and aluminum hydroxide or hydrated oxide is coprecipitated in step (a).

34. The method of claim 33 wherein the aqueous medium is at a basic pH of from about 8 to about 13.

35. The method of claim 34 wherein the aqueous medium is at a basic pH of from about 9 to about 11.

* * * * *

UNITED STATES PATENT AND TRADEMARK OFFICE
CERTIFICATE OF CORRECTION

PATENT NO. : 4,661,282

DATED : April 28, 1987

INVENTOR(S) : Howard W. Clark

It is certified that error appears in the above-identified patent and that said Letters Patent is hereby corrected as shown below:

Col. 1, line 63, after "and 4," [...;] respectively; x is $0 < x \leq 0.5$

Col. 2, line 50, after the word "is" [...] $0 < x \leq 0.5$

Col. 3, line 43, after "1," [...;] 2,3, and 4, respectively; x is $0 < x \leq 0.5$;

Col. 3, line 58, after the "1," ["...;] 2,3, and 4, respectively; x is $0 < x \leq 0.5$;

Signed and Sealed this

Nineteenth Day of July, 1988

Attest:

DONALD J. QUIGG

*Attesting Officer*  *Commissioner of Patents and Trademarks*